United States Patent
Graeve et al.

(10) Patent No.: US 7,540,776 B2
(45) Date of Patent: Jun. 2, 2009

(54) HEAT-SHRINK TUBE

(75) Inventors: Bernd Graeve, Neubiberg (DE); Peter Greiner, Bad Feilnbach (DE); Franz Josef Toerringer, Halfing (DE); David Francis Pearce, Swindon (GB); Timothy Stephen Smith, Trowbridge (GB); John David Stoker, Devizes (GB)

(73) Assignee: Tyco Electronics Raychem GmbH, Ottobrunn (DE)

( * ) Notice: Subject to any disclaimer, the term of this patent is extended or adjusted under 35 U.S.C. 154(b) by 72 days.

(21) Appl. No.: 10/595,933

(22) PCT Filed: Nov. 12, 2004

(86) PCT No.: PCT/GB2004/004811

§ 371 (c)(1),
(2), (4) Date: May 19, 2006

(87) PCT Pub. No.: WO2005/053129

PCT Pub. Date: Jun. 9, 2005

(65) Prior Publication Data

US 2007/0128925 A1 Jun. 7, 2007

(30) Foreign Application Priority Data

Nov. 20, 2003 (GB) ................................. 0327000.6

(51) Int. Cl.
*H01R 13/40* (2006.01)

(52) U.S. Cl. ...................................................... 439/588

(58) Field of Classification Search .......... 439/586–587, 439/588–589; 174/93, 73.1, 74, 88 R; 264/515, 264/573
See application file for complete search history.

(56) References Cited

U.S. PATENT DOCUMENTS

| 4,035,534 | A | | 7/1977 | Nyberg |
| 5,365,020 | A | * | 11/1994 | Vallauri et al. ............. 174/73.1 |
| 5,859,385 | A | * | 1/1999 | Nicolai ........................ 174/93 |
| 5,914,160 | A | | 6/1999 | Matsufuji et al. |
| 6,022,344 | A | * | 2/2000 | Meijer et al. ................. 604/533 |
| 6,896,842 | B1 | * | 5/2005 | Hamilton et al. ............ 264/515 |
| 7,063,181 | B1 | * | 6/2006 | Cunningham ............... 181/233 |

FOREIGN PATENT DOCUMENTS

| EP | 0 328 326 | 8/1989 |
| JP | 09238423 | 9/1997 |

OTHER PUBLICATIONS

PCT International Search Report dated Feb. 16, 2005 for Application No. PCT/GB2004/004811.

* cited by examiner

*Primary Examiner*—Jean F Duverne
(74) *Attorney, Agent, or Firm*—Barley Snyder LLC

(57) ABSTRACT

A heat-shrink tube for an electrical power cable comprises a sleeve having an insulating inner layer, a conductive outer layer and a thermoplastic mid-layer located between the inner and outer layers. The mid-layer is recovered by the application of heat thereto. The insulating inner layer is preferably comprised of an elastomeric material and the thermoplastic mid-layer is rigid and acts to retain the inner layer in a radially expanded state prior to its recovery.

6 Claims, 1 Drawing Sheet

HEAT-SHRINK TUBE

BACKGROUND OF THE INVENTION

1. Field of the Invention

The present invention relates to a heat-shrink tube for an electrical power cable, in particular a medium voltage power cable operating at voltages typically between 12 kV and 42 kV inclusive.

2. Summary of the Prior Art

Heat-shrink tubes for electrical power cables use heat-shrinkable polymeric technology to provide one or more heat recoverable sleeves having appropriate electrical characteristics which are shrunk into position around the ends of cables that have been electrically connected together. There are two main types of heat-shrink tubes currently in use for medium voltage (MV) electrical power cables.

A first type of heat-shrink tube is shown in FIGS. 1a and 1b and comprises a two-piece system that uses only heat-shrink materials to provide two heat recoverable sleeves that respectively provide insulation and an external conductive layer, which is required at the cable joint. An insulating-only sleeve 1 is installed first around the cable joint. A second, dual-layer sleeve 2 with a conductive outer layer 3 and an insulating inner layer 4 is then installed over a top of first sleeve 1 to provide a thicker insulating layer and the required conductive outer layer.

This heat-shrink tube is limited by the fact that it is not practical to manufacture sleeves comprising a thick wall of thermoplastic, heat-shrink material owing both to manufacturing difficulty, and to the problem posed in heating through the entire wall thickness of a thick tube sufficient to recover it, without over-heating the outer surface to the extent that damage occurs. This means that the maximum wall thickness of the insulating material is limited making it necessary to use multiple of the insulating-only sleeves 1 to create the required insulation thickness. Typically, two such sleeves are required for power cables operating at voltages up to around 24 kV. However, three or more of the insulating-only sleeves 1 are required if a higher voltage rating is required for the joint. The use of multiple insulating-only sleeves 1, however, causes its own problems not only because installation is prolonged but also because the increased number of interfaces between the multiple insulating-only sleeves 1 can lead to electrical problems as a result of air entrapment, contamination of the cable joint and the like.

A second type of heat-shrink tube is shown in FIG. 2 and comprises a single-piece, elastomeric insulating sleeve 5 in which a conducting heat-shrink outer layer 6 is used as a support mechanism for an elastomeric, insulating inner layer 7. The insulating inner layer 7 exerts an elastic force to shrink the insulating sleeve 5 but is prevented from doing so by the conductive, thermoplastic outer layer 6 that remains rigid until it is heated.

This second type of heat-shrink tube obviates the problems created by the use of multiple sleeves by replacing the inner thermoplastic insulating sleeve with the elastomeric insulating inner layer 7 that can recover without needing heat. This elastomeric insulating inner layer 7 is retained in an expanded form by the rigid conductive outer layer 6 that prevents recovery of the insulating sleeve 5 until the outer layer 6 is heated during installation. However, there are two main problems with this system. First, the elastomeric insulating inner layer 7 is slower to recover than the heat-shrink materials used in the first system. Second, because the elastomeric insulating inner layer 7 is not rigid, the only mechanism which prevents its recovery prior to installation is the rigid conductive outer layer 6. This means that the outer layer 6 is usually thicker than would otherwise be required for electrical reasons, thus adding materials and therefore cost to the product.

SUMMARY OF THE INVENTION

The object of the present invention is to provide a heat-shrink tube for an electrical power cable that overcomes or substantially mitigates the aforementioned problems of conventional heat-shrink tubes.

According to the present invention there is provided a heat-shrink tube for an electrical power cable comprising a sleeve or other hollow article having an electrically insulating inner layer, an electrically conductive outer layer, and between the inner and outer layers a thermoplastic mid-layer which can be softened by application of heat to the said sleeve or article to cause and/or permit dimensional recovery thereof.

Preferably, the insulating inner layer is comprised of an elastomeric material, which may contribute to the recovery of the sleeve or article.

The thermoplastic mid-layer is preferably electrically insulating and/or preferably substantially rigid, by which is meant at least sufficiently rigid to retain the inner layer in a radially expanded state prior to recovery. When used with the preferred elastomeric inner layer, softening of the mid-layer by the application of heat may permit the elastomeric recovery force of the expanded inner layer to shrink the sleeve or article. It will often be preferred that the mid-layer itself be heat-shrinkable to cause or contribute to the dimensional recovery of the sleeve or article. The mid-layer accordingly may be made from heat-shrinkable thermoplastic materials, for example semi-crystalline polyolefins or olefin co-polymers, which are well known and require no further explanation for those familiar with heat-shrink polymer technology. The usual cross-linking agents and other additives, for example colorings, fillers, and antioxidants, may optionally be included in the usual quantities as known in the art in all of the layers.

The conductive outer layer of the sleeve or article is preferably formed of polymeric material, for example the thermoplastics mentioned above, containing appropriate amounts of electrically conductive carbon blacks and/or other suitable electrically conductive fillers, as known in the art.

Examples of suitable compositions for the layers according to the present invention include the following, using known materials of the kinds indicated in proportions by weight selected within the specified ranges to total 100%:

Conductive Outer Layer
60-70% wt EVA (Ethylene/Vinyl Acetate copolymer)
10-20% wt HDPE (High Density Polyethylene)
15-25% wt Conductive carbon black
1-2% wt Aromatic amine antioxidant
Insulating Thermoplastic Mid-Layer
60-70% wt LLDPE (Linear Low Density Polyethylene)
30-40% wt Filler
1-2% wt Stabilizer
Insulating Elastomeric Inner Layer
40-50% wt EPDM (Ethylene Propylene Diene Monomer rubber)
10-20% wt PIB (Polyisobutylene)
25-40% wt Filler
2-5% wt Process aids
3-7% wt Stabilizers
3-5% wt Crosslinking agent The layered sleeve or article of the heat-shrink tube according to this invention is preferably of tubular, one-piece construction. The term "tubular" is used to indicate an elongate hollow article, which may be a substantially straight sleeve of substantially uniform round or oval cross-section, but is not necessarily limited to any particular longitudinal outline or uniformity of transverse dimensions.

The sleeve or article, especially sleeves of regular cross-sectional shape, may be manufactured efficiently by extrusion. However, layered moldings are not excluded and will often be preferable for articles of more complex shape.

As the thermoplastic mid-layer is substantially rigid prior to its recovery and therefore during storage conditions, the thickness of the conductive outer layer can be made thinner as compared to the previously known product. This is because the conductive outer layer now only has to perform an electrical function and is no longer required also to provide the hold-out mechanism, which is separately provided by the mid-layer. In addition, because the mid-layer need not carry the high loading of electrically conductive filler required in the outer layer, adequate hold-out performance can be achieved with a relatively thin mid-layer. Furthermore, an insulating mid-layer may be used to contribute to the total insulation thickness, thus allowing reduction of the inner insulation layer thickness. With the preferred elastomeric inner insulation, reduction in thickness reduces the elastomeric recovery force which the hold-out mid-layer must bear during storage, enabling further reduction in the hold-out thickness. Some or all of these reductions may accordingly be used to provide a sleeve or article whose total wall thickness is significantly less than that of the previously known jointings, thus usefully reducing bulk and weight, and importantly allowing heat to penetrate more quickly and bring about faster recovery, which is a considerable advantage in commercial use of the jointing according to the present invention.

BRIEF DESCRIPTION OF THE DRAWINGS

The present invention will now be described by way of example with reference to the accompanying drawings, in which.

DETAILED DESCRIPTION OF THE INVENTION

Figure 3:
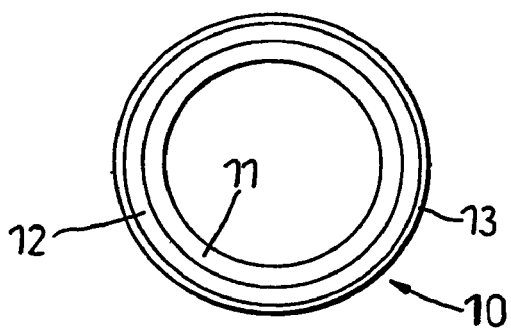
FIG. 3 is a transverse sectional view of a heat-shrink tube in accordance with the present invention.

A heat-shrink tube as shown in FIG. 3 comprises a sleeve 10 in the form of a one-piece, tubular extrusion which is made up of substantially co-axial radial layers consisting of an inner layer 11, an outer layer 13, and a mid-layer 12. The inner layer 11 comprises an electrically insulating layer comprised of an elastomeric material. The outer most layer 13 is thin and made of a conducting material. Between the inner and outer layers 11, 13 is the rigid, thermoplastic mid-layer 12. The mid-layer 12 is recovered by the application of heat thereto and therefore prior to installation of the sleeve 10 acts as a support to retain the elastomeric inner layer 11 in a radially expanded state. In addition, the mid-layer 12 is comprised of an electrically insulating material which provides the advantage that the elastomeric, insulating inner layer 11 can be made thinner than would otherwise be the case.

As aforementioned, because the thermoplastic mid-layer 12 is rigid prior to its recovery and therefore during storage conditions, the thickness of the conductive outer layer 13 can be made thinner, for example 0.5 mm as compared to 4 mm in the prior art described above. The mid-layer 12 may provide adequate support at a thickness of only 5 mm, allowing a reduction in the thickness of the elastomeric inner layer 11, for example from the previously known 11 mm to only 6 mm, thus maintaining a total 11 mm insulation thickness. The resulting wall thickness of all of the layers combined may thus be only 11.5 mm, which is significantly less than the total 15 mm thickness of the previously known sleeves having the dual-function conductive-and-support layer.

Figure 1A:
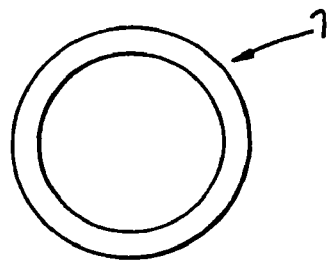
FIGS. 1a and 1b are respectively transverse sectional views of a conventional two-piece heat-shrink tube.
Figure 1B:
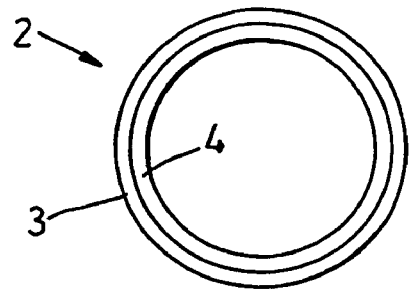

A further advantage arises from the fact that as the insulating layer of the sleeve 10 is made up of the inner layer 11 and the mid-layer 12, the mid-layer 12 does not need to be thick-walled, as in the prior art described above with reference to FIG. 1b. This means that a single tubular sleeve can be used even for power cables operating at higher voltages without multiple sleeves being required.

Also, as the thermoplastic mid-layer 12 has a faster installation speed than the elastomeric insulation material, the replacement of some of the elastomeric material by an insulating thermoplastic material in the mid-layer 12 of the present invention improves the recovery speed of the jointing as compared with the prior art.

It will thus be appreciated that the heat-shrink tube of the invention comprises a hybrid sleeve that combines both thermoplastic and elastomeric layers to alleviate the weaknesses of purely elastomeric sleeves and of those elastomeric sleeves which only comprise two layers.

Figure 2:
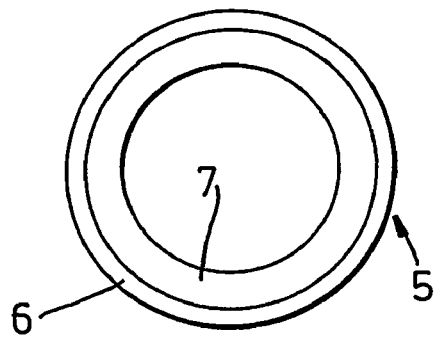
FIG. 2 is a transverse sectional view of a conventional one-piece heat-shrink tube.

In view of the foregoing advantages, it is estimated that there will be potential installation speed improvements of around 30%, perhaps as much as 50%, compared to the elastomeric insulating sleeve 5 described with reference to FIG. 2. Also, the sleeve 10 in accordance with the present invention should be sufficient for electrical power cables operating at voltages between 12 kV and 42 kV inclusive as compared to the multiple sleeve arrangements required with heat-shrink-only sleeves 1, 2 as described with reference to FIGS. 1a and 1b.

What is claimed is:

1. A heat-shrink tube for an electrical power cable comprising:
    a sleeve having an electrically insulating, elastomeric inner layer, an electrically conductive outer layer, and between the inner and outer layers a thermoplastic mid-layer which is softenable by application of heat to the sleeve to permit dimensional recovery thereof, the sleeve being of tubular, one-piece construction, the thermoplastic mid-layer being sufficiently rigid to retain the electrically insulating inner layer in a radially expanded state prior to recovery whereby the thermoplastic mid-layer supports the electrically insulating inner layer, and the outer layer having a thickness less than 50% than that of the thermoplastic mid-layer.

2. The heat-shrink tube as claimed in claim 1, wherein the thermoplastic mid-layer comprises an electrically insulating layer.

3. The heat-shrink tube as claimed in claim 1, wherein the sleeve is an extruded sleeve.

4. The heat-shrink tube as claimed in claim 1, wherein the sleeve is a molded sleeve.

5. The heat-shrink tube as claimed in claim 1, wherein the outer layer has a thickness less than 25% than that of the thermoplastic mid-layer.

6. The heat-shrink tube as claimed in claim 5, wherein the outer layer has a thickness less than 12.5% than that of the thermoplastic mid-layer.

* * * * *